US012330136B2

(12) United States Patent
Matteo et al.

(10) Patent No.: US 12,330,136 B2
(45) Date of Patent: Jun. 17, 2025

(54) SORPTION AGENT, METHOD OF MAKING A SORPTION AGENT AND BARRIER SYSTEM

(71) Applicant: National Technology & Engineering Solutions of Sandia, LLC, Albuquerque, NM (US)

(72) Inventors: Edward N. Matteo, Albuquerque, NM (US); Clay Payne, Albuquerque, NM (US); Amanda Sanchez, Albuquerque, NM (US); Nelson S. Bell, Albuquerque, NM (US); Yifeng Wang, Albuquerque, NM (US); Jessica N. Kruichak, Albuquerque, NM (US); Melissa Marie Mills, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 769 days.

(21) Appl. No.: 17/546,190

(22) Filed: Dec. 9, 2021

(65) Prior Publication Data

US 2022/0097020 A1   Mar. 31, 2022

Related U.S. Application Data

(62) Division of application No. 15/836,331, filed on Dec. 8, 2017, now Pat. No. 11,207,658.

(51) Int. Cl.
*B01J 20/22* (2006.01)
*B01J 20/08* (2006.01)
(Continued)

(52) U.S. Cl.
CPC ............. *B01J 20/223* (2013.01); *B01J 20/08* (2013.01); *B01J 20/28061* (2013.01);
(Continued)

(58) Field of Classification Search
CPC . B01J 20/223; B01J 41/09; B01J 20/08; B01J 20/28061; B01J 20/28064; B01J 20/20866
(Continued)

(56) References Cited

U.S. PATENT DOCUMENTS 6,033,556 A    3/2000  Didillon et al.
6,511,642 B1 *  1/2003  Hatanaka ............... B01D 53/02
                                              502/340
(Continued)

FOREIGN PATENT DOCUMENTS

WO    WO-2011066150 A2 *  6/2011  .............. B01J 23/80

OTHER PUBLICATIONS

Masahi Inoue et al., "An Ethylene Glycol Derivative of Boehmite." Inorganic Chemistry, vol. 27, No. 2, pp. 215-221. (Year: 1988).*
(Continued)

*Primary Examiner* — Patricia L. Hailey
(74) *Attorney, Agent, or Firm* — Daniel J. Jenkins

(57) ABSTRACT

An anionic sorption agent, method for forming the anionic sorption agent and a barrier system are disclosed. The anionic sorption agent including a modified pseudo or glycol-boehmite base comprising a structure having cationic metal ion sites. The method for forming the anionic sorption agent includes providing a pseudo or glycol-boehmite base and contacting the pseudo or glycol-boehmite base a modifying composition comprising a metallic ion to form the modified pseudo or glycol-boehmite base comprising a structure having cationic metal ion sites. The barrier system includes the anionic sorption agent comprising a first barrier component comprising a modified pseudo or glycol-boehmite base comprising a structure having cationic metal ion sites and a second barrier component comprising a cationic sorption agent.

10 Claims, 2 Drawing Sheets

(51) Int. Cl.
*B01J 20/28* (2006.01)
*B01J 41/09* (2017.01)

(52) U.S. Cl.
CPC ... *B01J 20/28064* (2013.01); *B01J 20/28066* (2013.01); *B01J 41/09* (2017.01)

(58) Field of Classification Search
USPC ....... 502/331, 355, 327, 335, 342, 346, 414, 502/415; 423/625, 628
See application file for complete search history.

(56) References Cited

U.S. PATENT DOCUMENTS

| | | | | |
|---|---|---|---|---|
| 7,268,097 | B2 * | 9/2007 | Katsuno | B01J 20/0244 208/217 |
| 11,207,658 | B1 * | 12/2021 | Matteo | B01J 20/3078 |
| 2002/0111263 | A1 * | 8/2002 | Stamires | B01J 23/007 502/63 |
| 2002/0159940 | A1 * | 10/2002 | Stamires | C09C 1/42 423/326 |

OTHER PUBLICATIONS

M. Shaw, et al. The determination of trace metal pollutants in environmental matrices using ion chromatography, Science Direct, Environmental International 30 (2004) 403-431, available online at www.sciencedirect.com.

Understanding Variation in Partition Coefficient, Kd, Values, vol. II, United States Environmental Projection Agency, Office of Air and Radiation, EPA 402-R-99-004B, Aug. 1999.

Understanding Variation in Partition Coefficient, Kd, Values, vol. III, United States Environmental Projection Agency, Office of Air and Radiation, EPA 402-R-04-002C, Jul. 2004.

R. Ghosh, et al. Geochemistry, Fate and Transport of Dissolved Arsenic in Petroleum Hydrocarbon-Impacted Groundwater, The RETEC Group, Inc., Battelle Pacific Northwest Laboratory, Group Environmental Management Company—A BP Affiliate (266-280).

I. N. Bhattacharya, et al. Adsorption of arsenic (V) and arsenic (III) onto different uncalcined and calcined aluminium hydroxide powder, The European Journal of Mineral Processing and Environmental Protection, vol. 5, No. 1, 1303-0868, 2005, pp. 48-62.

R. K. Iler, Fibrillar Colloidal Boehmite, Progressive Conversion to Gamma, Theta, and Alpha Aluminas, Dec. 1961, Journal of the American Ceramic Society, vol. 44, No. 12, pp. 618-624.

M. Inoue, et al. Reaction of Aluminium Alkoxides with Various Glycols and the Layer Structure of Their Products, J. Chem. Soc. Dalton Trans. 1991, pp. 3331-3336.

M. Inoue, et al. Alcohothermal Treatments of Gibbsite—Mechanisms for the Formation of Boehmite, Clays and Clay Minerals, vol. 37, Issue: 1, pp. 71-80, Publication Date 1989.

X. Wu, et al. Large-scale and additive-free hydrothermal synthesis of lamellar morphology boehmite, Powder Technology 239 (2013), pp. 155-161.

X. Chen, et al. Controlled hydrothermal synthesis of colloidal boehmite (y-AlOOH) nanorods and nanoflakes and their conversion into y-Al2O3 nanocrystals, Solid State Communications 145 (2008) pp. 368-373.

D. Mohan, et al. Arsenic removal from water/wastewater using adsorbents—A critical review, Department of Chemistry, Mississippi State University, Environmental Chemistry Division, accepted Jan. 2, 2007, available online Jan. 7, 2007.

* cited by examiner

US 12,330,136 B2

SORPTION AGENT, METHOD OF MAKING A SORPTION AGENT AND BARRIER SYSTEM

CROSS-REFERENCE TO RELATED APPLICATIONS

This patent application is a divisional of patent application Ser. No. 15/836,331, filed Dec. 8, 2017, entitled "SORPTION AGENT, METHOD OF MAKING A SORPTION AGENT AND BARRIER SYSTEM," which is commonly owned herewith, and the entirety of which is hereby incorporated herein by reference.

GOVERNMENT INTEREST STATEMENT

This invention was made with Government support under Contract No. DE-NA0003525 awarded by the United States Department of Energy/National Nuclear Security Administration. The U.S. Government has certain rights in this invention.

FIELD OF THE INVENTION

The present invention is directed to a structure and method of forming a sorption agent, method of making a sorption agent and barrier system.

BACKGROUND OF THE INVENTION

Removal of undesirable chemicals, particularly anionic pollutants, such as arsenic, from the environment is difficult and expensive. Arsenic contamination of groundwater affects millions of people across the world. These anionic pollutants are toxic and dangerous to humans.

Conventional clay landfill liners are only partially effective in removing very hazardous heavy metals, such as the aforementioned zinc, lead, copper, nickel, cadmium, and related heavy metals. Thus, if the quantity of leachate builds up in a landfill due to clogging of the collection piping, inadequate operation of the collection and removal system and/or inattention to the refuse landfill by maintenance personnel, the leachate can begin to penetrate into the clay landfill liner. Although the permeability of the clay landfill liner is relatively low, the leachate will eventually seep through the clay liner and enter the groundwater in the ground beneath the landfill liner.

Attempts to remove arsenic from contaminated systems have been made. These attempts include oxidation-reduction, precipitation, co-precipitation, electrolysis, solvent extraction, ion exchange, membrane separation and adsorption. In particular, adsorption for arsenic removal has been attempted using agents, such as activated charcoal, lanthanum oxide, aluminum hydroxide and activated alumina. However, such attempts have failed to provide the desired amount of removal of arsenic. In addition, some methods for removing the arsenic are expensive and/or complicated.

A common form of commercially available boehmite includes aqueous synthesized boehmite. Aqueous synthesized boehmite is commonly reported to develop a rod-like morphology, as shown by R. K. Iler, "Fibrillar Colloidal Boehmite; Progressive Conversion to Gamma, Theta, and Alpha Aluminas," J. Am. Ceram. Soc. 44 [12] 618-624, and X. Y. Chen, et al. "Controlled hydrothermal synthesis of colloidal boehmite (—AlOOH) nanorods and nanoflakes and their conversion into—Al2O3 nanocrystals," Solid State Comm. 145 [7-8] 368-373.

A method for removing anionic pollutants and anionic sorption agents that provide high rates of pollutant removal and do not suffer from the drawbacks of the prior art would be desirable in the art.

SUMMARY OF THE INVENTION

The disclosure is directed to an anionic sorption agent. The anionic sorption agent includes a modified pseudo or glycol-boehmite base comprising a structure having cationic metal ion sites.

The disclosure is also directed to a method of making an anionic sorption agent. The method includes providing a pseudo or glycol-boehmite base and contacting the pseudo or glycol-boehmite base, a modifying composition comprising a metallic ion to form a modified pseudo or glycol-boehmite base comprising a structure having cationic metal ion sites.

The disclosure is yet further directed to a barrier system. The barrier system includes a first barrier component comprising a modified pseudo or glycol-boehmite base comprising a structure having cationic metal ion sites. In addition, the barrier system includes a second barrier component comprising a cationic sorption agent.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
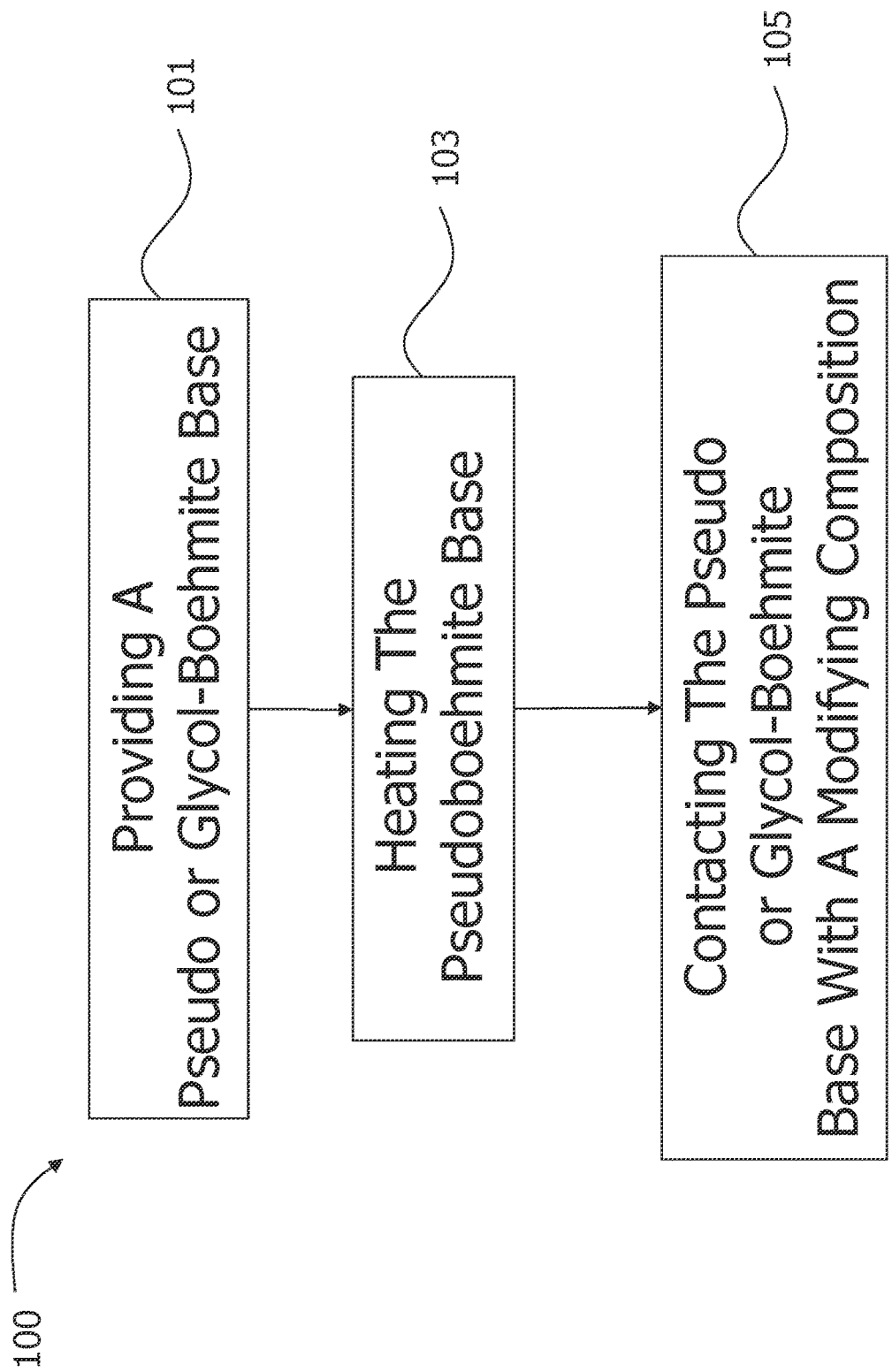
FIG. 1 shows a process flow diagram illustrating a process, according to the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Provided is an exemplary sorption agent having a modified pseudo or glycol-boehmite that has been modified by introducing metal ion to the surface in order to increase sorption capacity to anionic pollutants, such as arsenic. Embodiments of the present disclosure, in comparison to compositions and methods not utilizing one or more features disclosed herein, provide increased sorption and/or removal of anionic pollutants, such as arsenic. Sorption agents, according to the present disclosure, are suitable for water purification, engineered barrier material for waste isolation and landfill liner.

All numbers expressing quantities of ingredients and/or reaction conditions are to be understood as being modified in all instances by the term "about", unless otherwise indicated.

All percentages and ratios are calculated by weight unless otherwise indicated. All percentages are calculated based on the total weight of a composition unless otherwise indicated. All component or composition levels are in reference to the active level of that component or composition, and are exclusive of impurities, for example, residual solvents or by-products, which may be present in commercially available sources.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The term "at least one," as used herein, means one or more and thus includes individual components as well as mixtures/combinations.

The term "comprising" (and its grammatical variations), as used herein, is used in the inclusive sense of "having" or "including" and not in the exclusive sense of "consisting only of."

An embodiment of the present disclosure includes an anionic sorption agent having a modified pseudo or glycol-boehmite base including a structure having cationic metal ion sites. The modified pseudo or glycol-boehmite is formed from a pseudo or glycol-boehmite base. "Sorption", as utilized herein, includes the processes of adsorption and absorption of materials and/or ions, such as metals. The anionic sorption agent, according to the present disclosure, includes a pseudo or glycol-boehmite base modified either directly during synthesis (e.g., a one pot reaction), or in a two-stage embodiment with a surface adsorption, ion exchange, or intercalation reaction.

In one embodiment, the anionic sorption agent, according to the present disclosure, includes a modified pseudo or glycol-boehmite having cationic metal ion sites including metal ions selected from the group consisting of Mn, Fe, Co, Ni, Cu, Zn, and combinations thereof. In another embodiment, the cationic metal ion sites may include metal ions selected from the group consisting of Y, Ga, Fe, Si, P, S, Ti, Zr, Hf, and combinations thereof. In one particularly suitable embodiment, the anionic sorption agent, according to the present disclosure, includes Ni ions.

In one embodiment, the anionic sorption agent, according to the present disclosure, includes a modified pseudo or glycol-boehmite having a surface area of greater than about 160 m$^2$/g, greater than about 170 m$^2$/g, greater than about 180 m$^2$/g, greater than about 185 m$^2$/g, greater than about 186 m$^2$/g, from about 175 to about 195 m$^2$/g, from about 180 to about 190 m$^2$/g, or from about 185 to about 188 m$^2$/g.

The material is synthesized with a morphology that is flaky or low packing density. In one embodiment, the number of atomic layers in the flakes is less than 10, and measured at 5. Platelet or flaky morphology will express a high proportion of b-plane character, and edge sites in the a-c directions. The resultant morphology is believed to affect surface properties. The interlayer spacing can also affect the adsorption of ions by surface effects, or by ionic intercalation between sheets.

FIG. 1 shows an exemplary method 100 of making the anionic sorption agent. The method includes providing a pseudo or glycol-boehmite base (step 101). The pseudo or glycol-boehmite base is a pseudo or glycol-boehmite material. Pseudo-boehmite, as utilized herein, is an α-alumina hydrate having additional water molecules in the crystal, as compared to boehmite. Pseudo or glycol-boehmite is generally represented by $Al_2O_3 \cdot xH_2O$ wherein x is not less than 1 and less than 2 and includes a relatively large specific surface area and pore structure. Pseudo or glycol-boehmite for use with the present disclosure includes commercially available pseudo or glycol-boehmite. In one embodiment, the pseudo or glycol-boehmite base is formed utilizing glycol-thermal reactions, based on synthesis compositions including glycol solvents, such as glycol solvents having carbon chains ranging from ethylene glycol to 1,6 hexanediol. One particularly suitable glycol solvent is 1,4 butanediol. In one example, the pseudo or glycol-boehmite base preparation involves a solution of $AlCl_3$ and NaOH in water, mixed with ethanol solutions of cetyltrimethyl ammonium bromide (CTAB), followed by a pressure reaction at 160 in a hydrothermal vessel. The fabrication includes $Al(OH)_3$ in the glycol solvent, with a small amount of KOH for base control. The composition is reacted at 250° C. for 24 hours.

Suitable pseudo or glycol-boehmite bases include materials described by Inoue, in M. Inoue, Y. Kondo, and T. Inui, "An Ethylene glycol derivative of boehmite," Inorganic Chemistry, 27 [2] (1988) 215-221. The pseudo or glycol-boehmite base materials formed are structurally distinct from aqueous phase synthesized boehmite, and have an expanded b-axis in the crystal unit cell. They also as a result are containing organic materials that must burn out during thermal treatments, and could be labeled a hybrid material. Further, heating of the glycol-boehmite will lead to either removal by evaporation, or by combustion, of the glycol molecules. These can convert into organic char or graphite phases, or amorphous alumina structures or gamma-alumina with high surface area. The intercalated alumina-graphite materials can have distinct adsorption properties as well. In one embodiment, the modified pseudo or glycol-boehmite base includes a high proportion of planes normal to the b-axis and a sheet-like or platelet morphology. In this embodiment, the modified pseudo or glycol-boehmite base includes a flower-like or honeycomb-like morphology.

The pseudo or glycol-boehmite base is heated to remove water from the pseudo or glycol-boehmite structure (step 103). The heating is performed at any suitable temperature for any suitable time to sufficient water from the pseudo or glycol-boehmite structure to permit ionic modification of the structure with selected metallic ions. In one embodiment, the pseudo or glycol-boehmite base is heated to a temperature of from about 75° C. to about 105° C., or from about 80° C. to about 100° C. or about 90° C. In one embodiment, the pseudo or glycol-boehmite base is maintained at the elevated temperature for a time of at least about 8 hours, or at least about 10 hours, or at least about 12 hours. The heating of the pseudo or glycol-boehmite base is preferably performed at sufficient temperature and for a time to increase the surface area of the pseudo or glycol-boehmite base. For example, the increase in surface area may include an increase of at least 75%, or increase of at least 85%, or an increase of at least 95%, or an increase of at least 100%. In one embodiment, the surface area of the dried pseudo or glycol-boehmite base after heating is greater than 140 m$^2$/g, or greater than 150 m$^2$/g, or greater than 155 m$^2$/g.

The method further includes contacting the pseudo or glycol-boehmite base with a modifying composition comprising a metallic ion (step 105). The modifying composition includes a composition suitable for depositing the metallic ions in the structure of the dried pseudo or glycol-boehmite.

In one embodiment, the modifying composition is a solution comprising metal ions selected from the group consisting of Mn, Fe, Co, Ni, Cu, Zn, and combinations thereof. In another embodiment, the modifying composition may include a solution of metal ions selected from the group consisting of Y, Ga, Fe, Si, P, S, Ti, Zr, Hf, and combinations thereof. In one particularly suitable embodiment, the metal ion is nickel. The modifying composition may include any suitable solution for depositing the metal ions into the structure of the pseudo or glycol-boehmite. For example, the solution may be a chloride, such as nickel chloride ($NiCl_2$). The incorporation of the ions from the modifying composition may be accomplished via any suitable mechanism, such as, but not limited to, surface adsorption, ion exchange, or intercalation reaction.

In an alternate embodiment, the modifying composition may be incorporated into the synthesis of the pseudo or glycol-boehmite base. For example, the dopant ions present in a glycol synthesizing composition, during the glycol-thermal synthesis of the glycol-boehmite base, include metal ions selected from the group consisting of Y, Ga, Fe, Si, P, S, Ti, Zr, Hf, and combinations thereof, to form a glycol-boehmite base having metal ions selected from the group consisting of Y, Ga, Fe, Si, P, S, Ti, Zr, Hf, and combinations thereof.

One embodiment includes a barrier system incorporating the anionic sorption agent, according to the present disclosure. The barrier layer may include a landfill liner for capturing heavy metals and the like to prevent groundwater contamination, for example, in the event of leachate leakage through the landfill liner. However, the barrier system is not so limited and may be used as a barrier for any suitable waste material.

Figure 2:
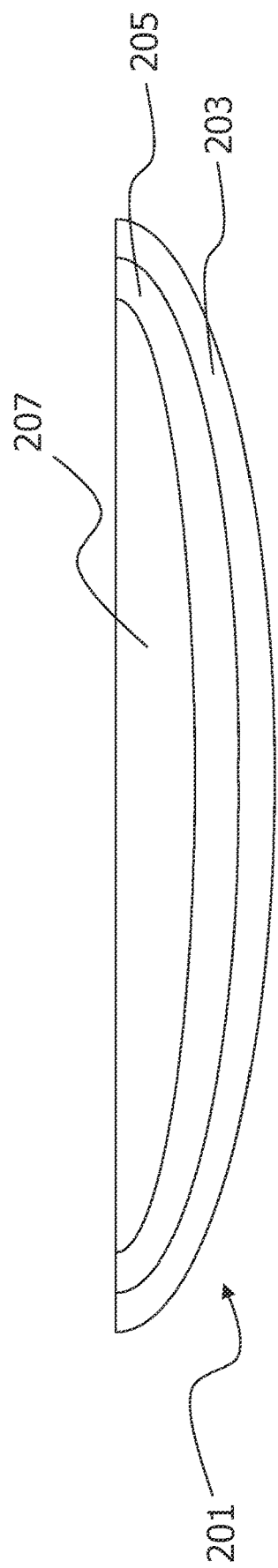
FIG. 2 shows an exemplary embodiment of a barrier system, according to an embodiment of the disclosure.

FIG. 2 shows an exemplary barrier system 201, according to the present disclosure. The barrier system 201 shown in FIG. 2 includes a layered system including a first barrier component 203 and a second barrier component 205. Waste 207 is partially bound to the barrier system 201. The waste may be industrial waste, landfill waste, contaminated groundwater or other contaminated material containing anionic and/or cationic metal contaminants. Although FIG. 2 shows a layered configuration, other configurations, such as a combined or mixed system may also be utilized. The first barrier component 203 includes a modified pseudo or glycol-boehmite base comprising a structure having cationic metal ion sites and a second barrier component comprising a cationic sorption agent. The first barrier component 203 further includes a carrier. Suitable carriers include, but are not limited to, a bentonite slurry or a pelletized composite of the anionic sorbent in a matrix of bentonite. Other additive components that provide additional barrier properties may also be provided in the first barrier component 203. In one embodiment, the anionic sorbent may be mixed into a grout matrix, either chemical grout or cementitious grout, which are used for a variety of geotechnical applications. The barrier system 201 further includes a second barrier component 205 that includes a cationic sorption agent. The cationic sorption agent, as utilized herein, includes materials that provides adsorption and absorption of cationic species. One particularly suitable cationic sorption agent is clay. In one embodiment, the clay is bentonite clay. In bentonite clay, the predominate clay is montmorillonite which is an essentially the pure form of bentonite. In addition, other suitable clays can be used in barrier systems, according to the present disclosure. The combination of the first barrier component 203 and the second barrier component 205 permits the sorption of both anionic and cationic species, particularly from waste 207. In another embodiment, the barrier system 201 includes a structure formed by conventional grouting techniques, such as chemical grout mixtures, such as, polymeric polyurethanes and acrylamides, and resinous grouts, such as, urethanes or epoxies. Embodiments including the grouting barrier system, according to the present disclosure, have the advantage of being customized or engineered for specific purposes, for example, permitting a grouting barrier system that conforms to the geotechnical demands of the given site.

The following examples are intended to further illustrate the present invention. They are not intended to limit the invention in any way.

Example

A sorption agent, according to the present disclosure, was prepared by the following method. The sorption agent was a nickel modified glycol-boehmite.

Pre-Modification Processing

A Parr Instruments 600 mL stirred pressure reactor was used to prepare the glycol-boehmite material, using 200 mL of 1,4 butanediol. To the 1,4 butanediol, 5 grams of $Al(OH)_3$ (gibbsite phase) powder was mixed using a mortar and pestle. 0.5 g of KOH was added to raise reaction pH. The pressure reactor was loaded with the precursors, and purged using dry nitrogen. The system was heated to 250° C. in a 2-hour ramp, and held at 250° C. for 24 hours. The stirring rate was approximately 300 rpm. The prepared material was recovered from the 1,4-butanediol by centrifugation, and washing using ethanol. The final material was provided for further surface treatments. Surface area measurements were completed on the glycol-boehmite using a Tristar 3000 BET surface area analyzer with degas conditions 30° C. hold for 30 minutes with additional 140° C. soak for 120 minutes. The initial glycol-boehmite BET surface area was 82.76 $m^2/g$. Initially there was a visible amount of condensation that was left on the tubes after the degas phase, indicating water was still present. Using an oven, the glycol-boehmite was heated to 90° C. until there was no change in mass, which took about 12 days. The BET surface area was measured again and no condensation formed and the surface area of the dried glycol-boehmite was 156.55 $m^2/g$. The surface areas of the ingredients are shown in TABLE 1.

TABLE 1

| | Surface Area | | |
|---|---|---|---|
| | Boehmite As Received ($m^2/g$) | Dried Boehmite ($m^2/g$) | Ex. 1 (nickel modified boehmite) ($m^2/g$) |
| Surface Area | 82.76 | 156.55 | 186.02 |

Glycol-Boehmite/Ni Synthesis Procedure 0.05 g of the heated and dried glycol-boehmite was added to 30 mL of 0.01M $NiCl_2$ solution. The solution containing the $NiCl_2$ and glycol-boehmite was placed on a shaker table and was agitated overnight. The glycol-boehmite/$NiCl_2$ solution was centrifuged and the supernate was decanted. The remaining solids were allowed to dry in an oven at 60° C. for 48 hours, yielding the nickel modified glycol-boehmite, according to the present disclosure. The nickel modified glycol-boehmite had a BET surface area of 186.02 m2/g.

Arsenic Sorption Measurements

Arsenic sorption reactors were prepared. The arsenic sorption reactions were carried out in centrifuge tubes. The modified and unmodified boehmite materials were suspended in solution and arsenate bearing solution was added to the centrifuge tube and agitated. The experiments included trials of the glycol-boehmite base, the Ni-modified boehmite base, and a duplicate of each. Specifically, the trials included heated and dried glycol-boehmite (Comparative Ex. 1), the nickel modified glycol-boehmite (Example 1) and a control (Comparative Ex. 2). The control was DI water, which lacking a sorbent, sorbed no arsenate.

0.1 g of solid was added to 19.9 mL of 18.2 Megaohm-cm deionized water and left on a shaker table for 24 hours. After overnight equilibration, the reactors were spiked with 0.1 ml 0.01M sodium arsenate; total arsenic concentration was 3.75 ppm. Reactors were then allowed to shake for 24 hours. Reactors were centrifuged and filtered using 0.2 um syringe filters and acidified using optima grade concentrated nitric acid (for every 1 mL of sample 10 ul acid was added). Arsenic concentrations were analyzed using ICP-OES at the 193 nm wavelength. The kD values were then calculated. Results are shown in Table 2.

TABLE 2

Concentration of Arsenic After Sorption

| kD Value | Example 1 (0.1 g of nickel modified boehmite) | Comp. Ex. 1 (0.1 g of dried boehmite) | Comp. Ex. 2 (0.1 g of control) |
| --- | --- | --- | --- |
| Trial 1 | 5761 | 133 | 0 |
| Trial 2 | 7094 | 138 | 0 |

The nickel modified glycol-boehmite showed a 40-fold increase in arsenic removal compared to the unmodified glycol-boehmite.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of making an anionic sorption agent comprising:
   providing a pseudo-boehmite base or glycol-boehmite base; and
   contacting the pseudo-boehmite base or glycol-boehmite base with a modifying composition comprising a metallic ion to form a modified pseudo-boehmite base or glycol-boehmite base comprising an anionic sorption agent comprising having cationic metal ion sites;
   wherein the contacting includes a surface adsorption, ion exchange, or intercalation reaction.

2. The method of claim 1, further comprising heating the pseudo-boehmite base or glycol-boehmite base to remove water from the pseudo-boehmite base or glycol-boehmite base.

3. The method of claim 1, wherein the modifying composition is a solution comprising metal ions selected from the group consisting of Mn, Fe, Co, Ni, Cu, Zn, and combinations thereof.

4. The method of claim 3, wherein the cationic metal ion site includes Ni.

5. The method of claim 3, wherein the modifying composition is $NiCl_2$.

6. The method of claim 1, wherein the providing and contacting are incorporated in a single synthesis step.

7. The method of claim 6, wherein the cationic metal ion sites have been incorporated during the single synthesis step.

8. The method of claim 7, wherein the single synthesis step includes forming a glycol-boehmite base in a glycol solvent.

9. The method of claim 8, wherein the synthesis step includes providing modifying composition containing dopant ions selected from the group consisting of Y, Ga, Fe, Si, P, S, Ti, Zr, Hf, and combinations thereof.

10. The method of claim 1, wherein the modified pseudo or glycol-boehmite base includes a surface area greater than about 160 $m^2/g$.

* * * * *